June 5, 1962    F. S. LAPEYRE ET AL    3,037,237
MACHINE FOR SHUCKING OYSTERS
Original Filed Sept. 11, 1956    9 Sheets-Sheet 1
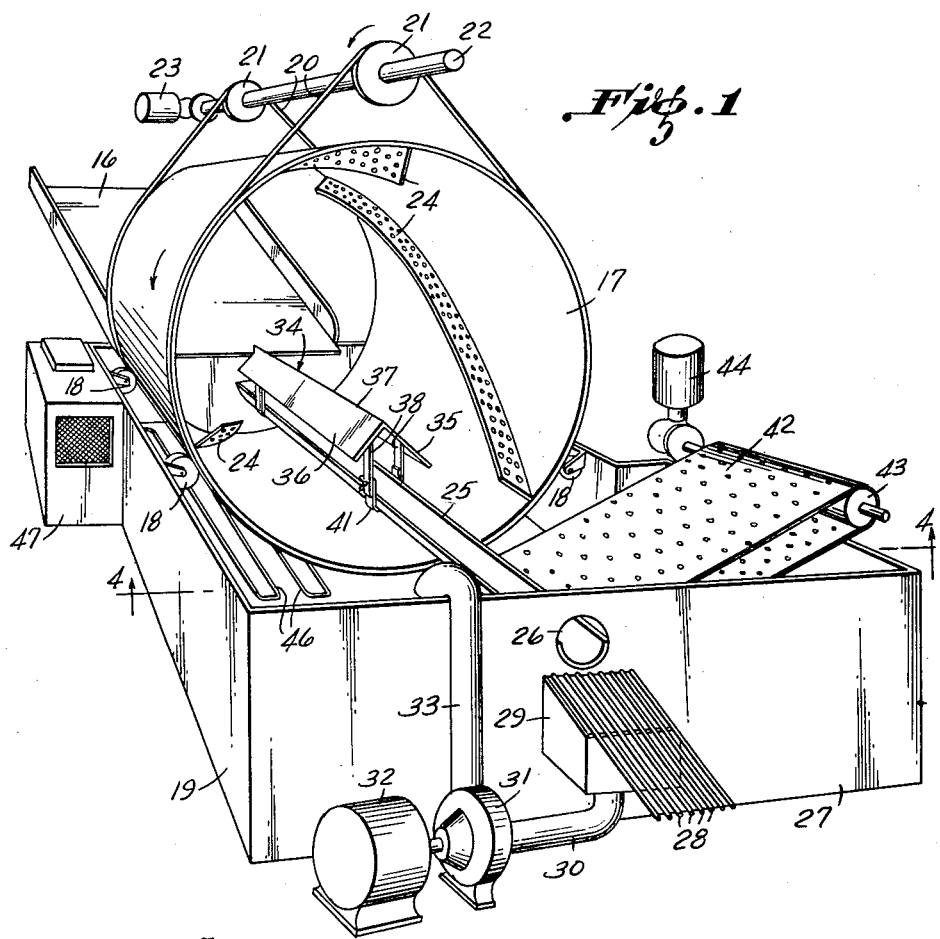
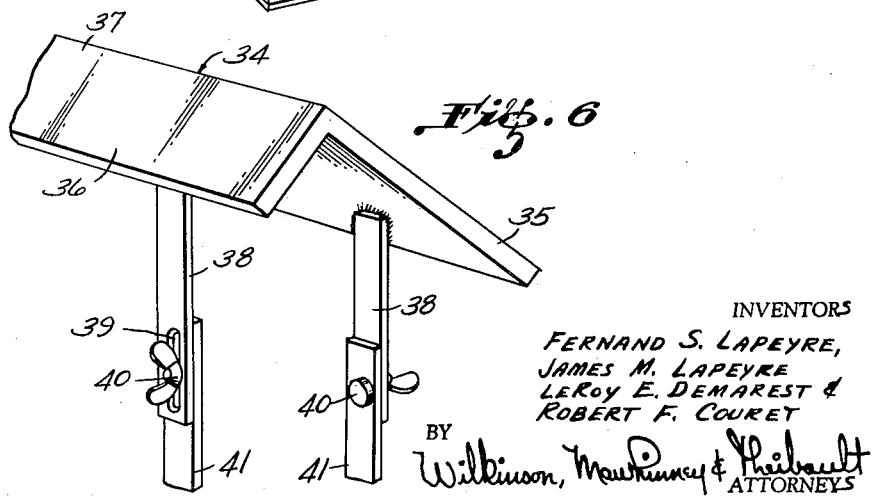
INVENTORS
FERNAND S. LAPEYRE,
JAMES M. LAPEYRE
LeRoy E. DEMAREST &
ROBERT F. COURET
BY
Wilkinson, Mawhinney & Thibault
ATTORNEYS June 5, 1962     F. S. LAPEYRE ET AL     3,037,237
MACHINE FOR SHUCKING OYSTERS Original Filed Sept. 11, 1956     9 Sheets-Sheet 2

INVENTORS
FERNAND S. LAPEYRE,
JAMES M. LAPEYRE,
LE ROY E. DEMAREST
& ROBERT F. COURET
BY
Wilkinson, Mawhinney & Thibeault
ATTORNEYS June 5, 1962 F. S. LAPEYRE ET AL 3,037,237
MACHINE FOR SHUCKING OYSTERS
Original Filed Sept. 11, 1956 9 Sheets-Sheet 5

INVENTORS
FERNAND S. LAPEYRE,
JAMES M. LAPEYRE,
LEROY E. DEMAREST &
ROBERT F. COURET
BY
Wilkinson, Mawhinney & Thibault
ATTORNEYS

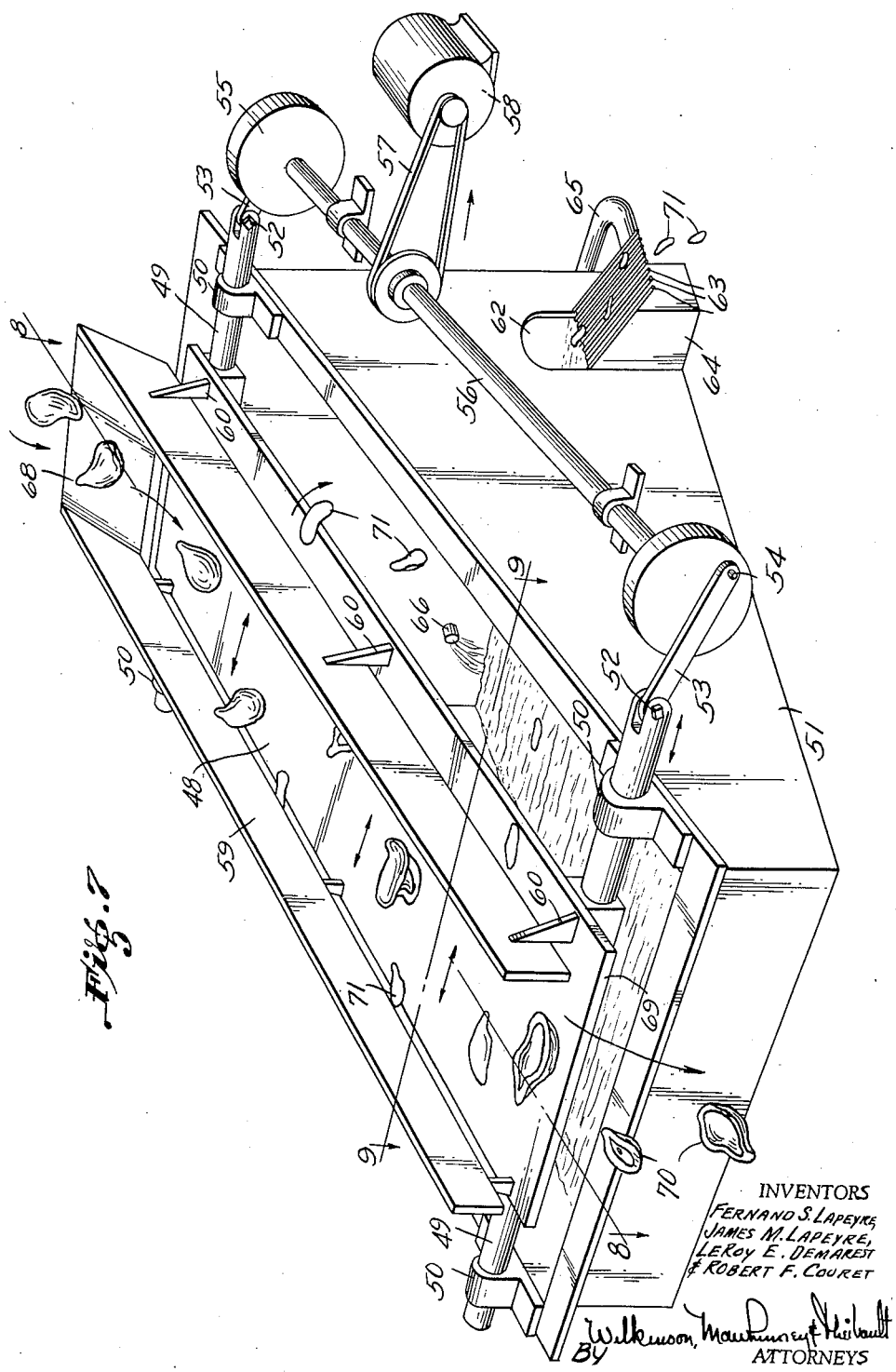

June 5, 1962     F. S. LAPEYRE ET AL     3,037,237
MACHINE FOR SHUCKING OYSTERS
Original Filed Sept. 11, 1956     9 Sheets-Sheet 7
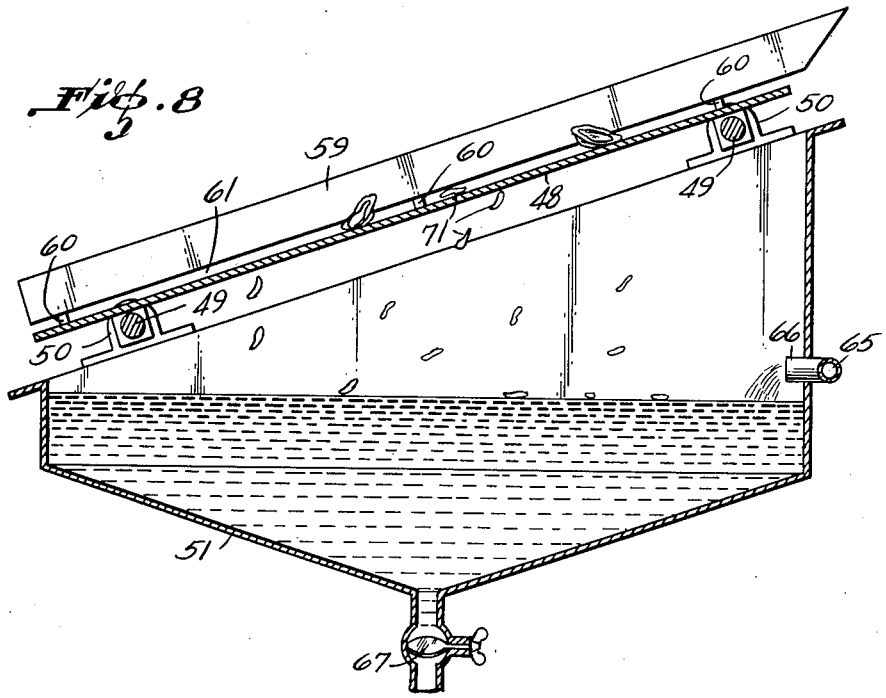
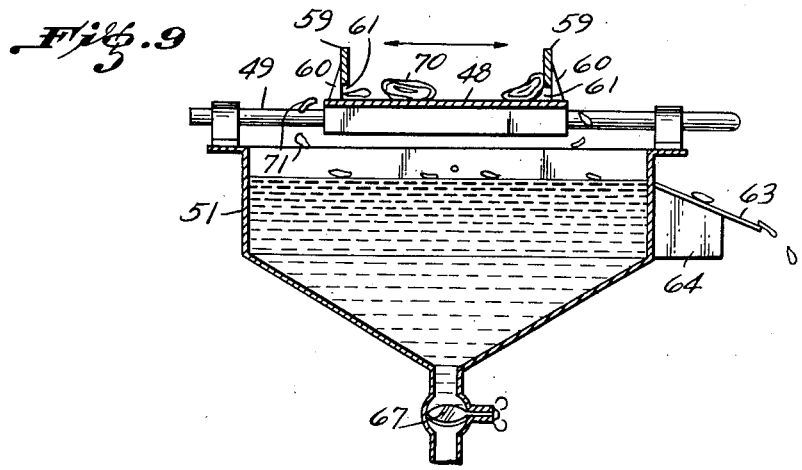
INVENTORS
FERNAND S. LAPEYRE,
JAMES M. LAPEYRE,
LE ROY E. DEMAREST
& ROBERT F. COURET
BY Wilkinson, Mawhinney & Thibault
ATTORNEYS June 5, 1962 F. S. LAPEYRE ET AL 3,037,237
MACHINE FOR SHUCKING OYSTERS
Original Filed Sept. 11, 1956 9 Sheets-Sheet 8

INVENTORS
FERNAND S. LAPEYRE,
JAMES M. LAPEYRE,
LEROY E. DEMAREST &
ROBERT F. COURET
BY
Wilkinson, Mawhinney & Thibault
ATTORNEYS June 5, 1962   F. S. LAPEYRE ET AL   3,037,237
MACHINE FOR SHUCKING OYSTERS
Original Filed Sept. 11, 1956   9 Sheets-Sheet 9
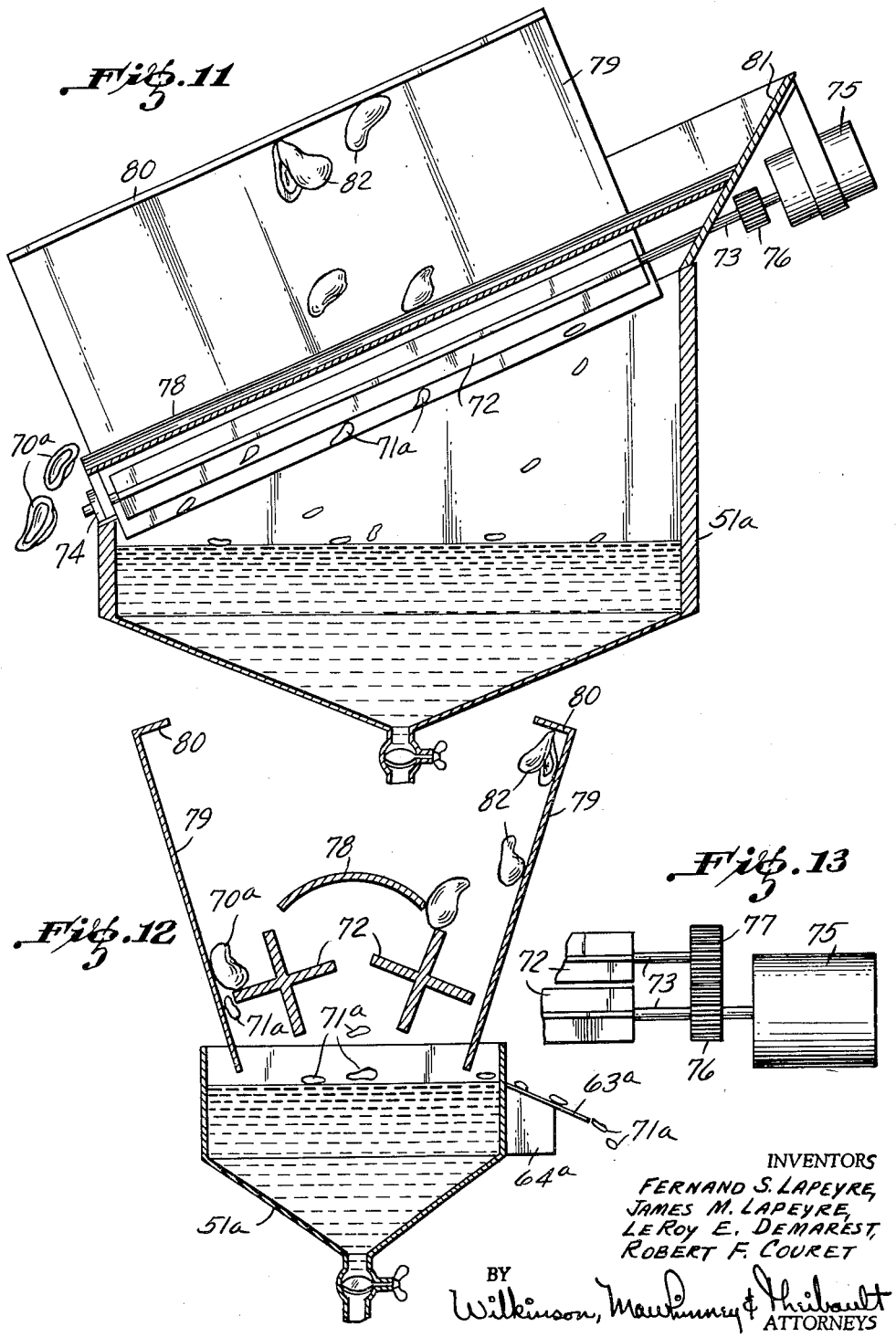
INVENTORS
FERNAND S. LAPEYRE,
JAMES M. LAPEYRE,
LE ROY E. DEMAREST,
ROBERT F. COURET
BY Wilkinson, Mawhinney & Thibault
ATTORNEYS

United States Patent Office 3,037,237
Patented June 5, 1962

3,037,237
MACHINE FOR SHUCKING OYSTERS
Fernand S. Lapeyre, James M. Lapeyre, Le Roy E. Demarest, and Robert F. Couret, New Orleans, La., assignors to The Peelers Company, Houma, La., a partnership
Original application Sept. 11, 1956, Ser. No. 609,248. Divided and this application Jan. 10, 1958, Ser. No. 710,834
12 Claims. (Cl. 17—9)

Oysters of the Atlantic and Gulf of Mexico area species have a two-valved shell which encloses a soft body. The body of this sedentary inhabitant of inland water rests on a cup-like shell or valve. The other shell or valve is usually flat. The narrower end of the shell is the anterior end. The broad, rounded end is the posterior. The valves, at the anterior end, are held together at a narrow hinge by an elastic ligament.

Shells consist of layers of organic substance, conchiolin, impregnated with calcium carbonate and small quantities of other mineral salts secreted by the mantle.

The composition, chemically, of the oyster meat is substantially as follows:

|  | Percent |
|---|---|
| Protein | 8–11 |
| Carbohydrates | 3.7–9.6 |
| Glycogen | [1] 0.4–9.6 |
| Fat | 1.2–2.5 |
| Mineral salts (ash) | 0.9–3 |
| Water | 76–[1] 89 |

[1] Summer months.

Also contains traces of sodium, potassium, calcium, magnesium, chlorine, bromine, iodine, phosphorus, sulphur, iron, copper, zinc, such contents varying with native water.

Oysters open by relaxing the single adductor muscle, called the "eye," which passes through the body to connect the shells. The spring-like action of the elastic ligament at the hinge forces the valves apart and the shell opens.

An oyster will close and hermetically seal its shell in the presence of mechanical disturbance, changes in light, or irritating substances. These conditions are sensed by the two rows of tentacles along the outer edge of the mantle which embraces the body. Closure occurs when striated fibers of the adductor muscle contract and pull the two valves together.

Out of water the oyster thus sealed will retain water and survive about one week at 65° F.; about three weeks at 45° F.; and as long as four months when kept at just a few degrees above freezing. However, warming, shaking, or rough handling will cause the adductor to relax, valves to gap, water to be lost, and subsequent death of the oyster.

Except when in undisturbed enjoyment of its natural habitat, a live oyster keeps its shells so tightly closed as to require the application of great force to pry the shells open.

When an oyster is removed from its shell, it immediately begins to "bleed," losing much of its juices and liquid with consequent loss of weight and flavor. Ideally, therefore, an oyster should be eaten immediately upon its shells being opened and the meat removed therefrom. Hence the popularity of the "oyster bars."

These factors have posed problems in connection with the economical marketing of oysters at a distance from the sea regions where they abound. The oysters must be shipped in their shells under refrigeration, they must be forcibly opened, and, in order to preserve yield and flavor, must be immediately consumed.

Hitherto, most oysters have been opened manually and either sold for relatively immediate consumption or have been processed and canned. Lately devices have been utilized to open oysters by mechanical means but only after steaming (Harris Patent 2,608,716).

Manual opening of oysters involves great expense. Inevitably, the meat is mutilated by the knives used in prying open the shells and in detaching the adductor muscle or "eye" from the shell. Even if frozen within a short time of opening, there is loss of yield and flavor because of "bleeding" of the juices and liquid. The operation of manual opening is unhygienic, and great care must be taken to preserve the meat until consumption because of the tendency towards rapid spoilage of raw meats once they are removed from the shells or valves.

The manual opening of oysters is difficult and costly, and on that account, commercial producers often steam the oysters in order to render manual opening easier. However, the steaming of an oyster has many disadvantages. Steaming causes the oyster to "bleed" even while still within its shell, and upon opening of the shells the juices and liquids are irretrievably lost. Steaming causes the meat to shrivel, and the partial cooking of the meat deprives the oyster of its marketability as a fresh, raw oyster. When oysters are pre-steamed, they are usually canned and processed within the can to kill bacteria, and the resulting product is commonly regarded as inferior to a fresh, raw oyster. The steaming, though it may render opening of the shell easier, still does not prevent mutilation of the meats from the knives used in the process of manual opening.

Also, pre-steaming of the oysters does not always sufficiently diminish the adherence of the adductor muscle, or "eye" to the shells. Accordingly, when the shells are forced apart by the shear force produced, for instance by tumbling of the oysters according to the Harris patent, the adductor muscle is at times torn from the meat by reason of its adherence to one of the shells. When this happens, a very significant loss in yield results and the "eye" (regarded by some connoisseurs as the choicest portion of the oyster) is irretrievably lost.

In tumbling, shells are apt to fall upon previously separated meats and to cut or puncture the meats, thus producing even more rapid "bleeding."

It is an object of the invention to provide a machine for shucking oysters whereby "bleeding" is eliminated or minimized and the original weight, flavor and value of the oyster thus preserved and made to survive the opening or shucking process.

It is also an object of the invention to provide a machine whereby mutilation of the oyster meat is eliminated or minimized and whereby the adductor muscle or "eye" is preserved as an integral part of the oyster meat.

It is a further object of the invention to provide an apparatus for the treatment of oysters whereby the meat within the closed shells is solidified, or converted initially to a semi-solid state in which the liquid content will not flow on the opening of the shells, and by which the oysters may be shucked, and the oyster meats and the shells separated and removed to different destinations.

A still further object of the invention is to achieve the foregoing purposes effectively and economically and resulting in the production of oyster meats of high marketable value.

The present invention is a division of our application, Serial No. 609,248, filed September 11, 1956, now abandoned.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a perspective view of a machine for shucking oysters according to one form of the invention.

FIGURE 6 is a fragmentary isometric view of the anvil showing a form of adjusting means therefor.

FIGURE 7 is an isometric view of a modified form of machine.

FIGURE 8 is a longitudinal sectional view taken through the same on the line 8—8 of FIGURE 7.

FIGURE 9 is a cross-sectional view taken on the line 9—9 of FIGURE 7.

FIGURE 11 is a longitudinal sectional view taken on the line 11—11 of FIGURE 10.

FIGURE 12 is a cross-sectional view taken on the line 12—12 of FIGURE 10.

FIGURE 13 is an enlarged fragmentary plan view of a detail of the paddle drive.

Figure 2:
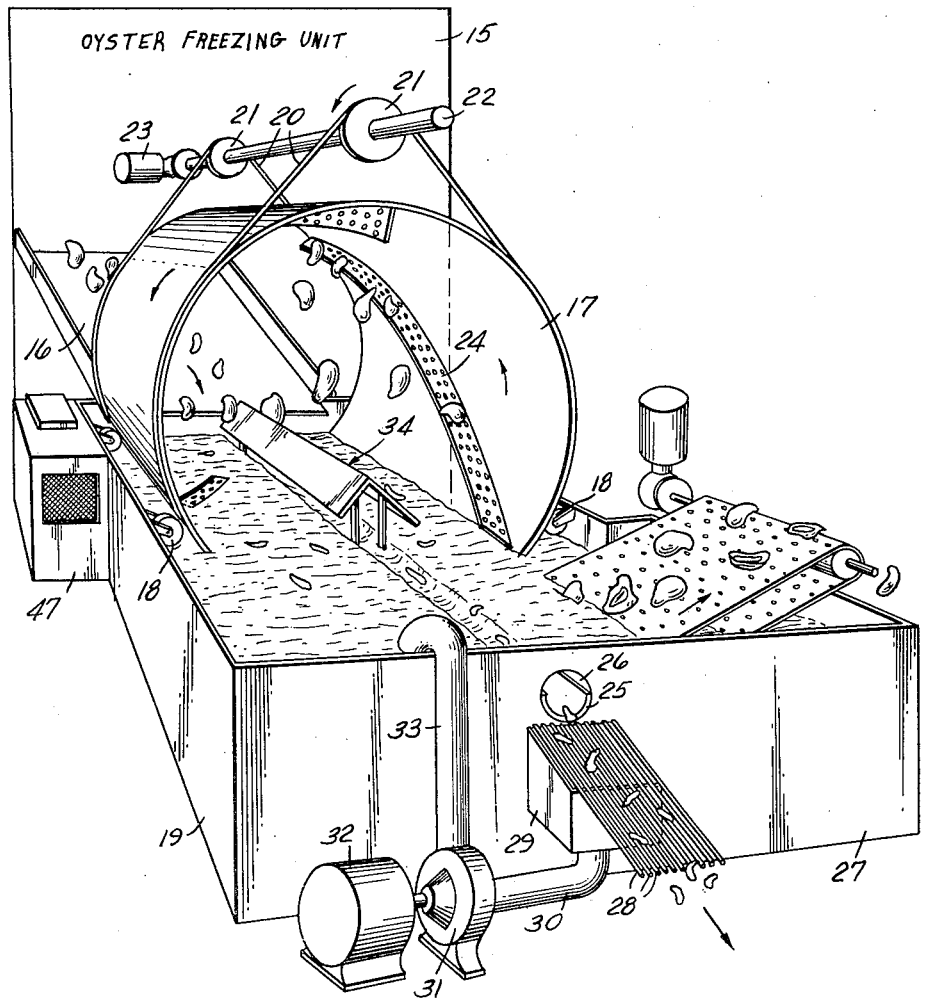
FIGURE 2 is a similar view illustrating the brine solution in the tank and oysters and oyster meats in the process of being shucked and separated pursuant to the improved process.
Figure 3:
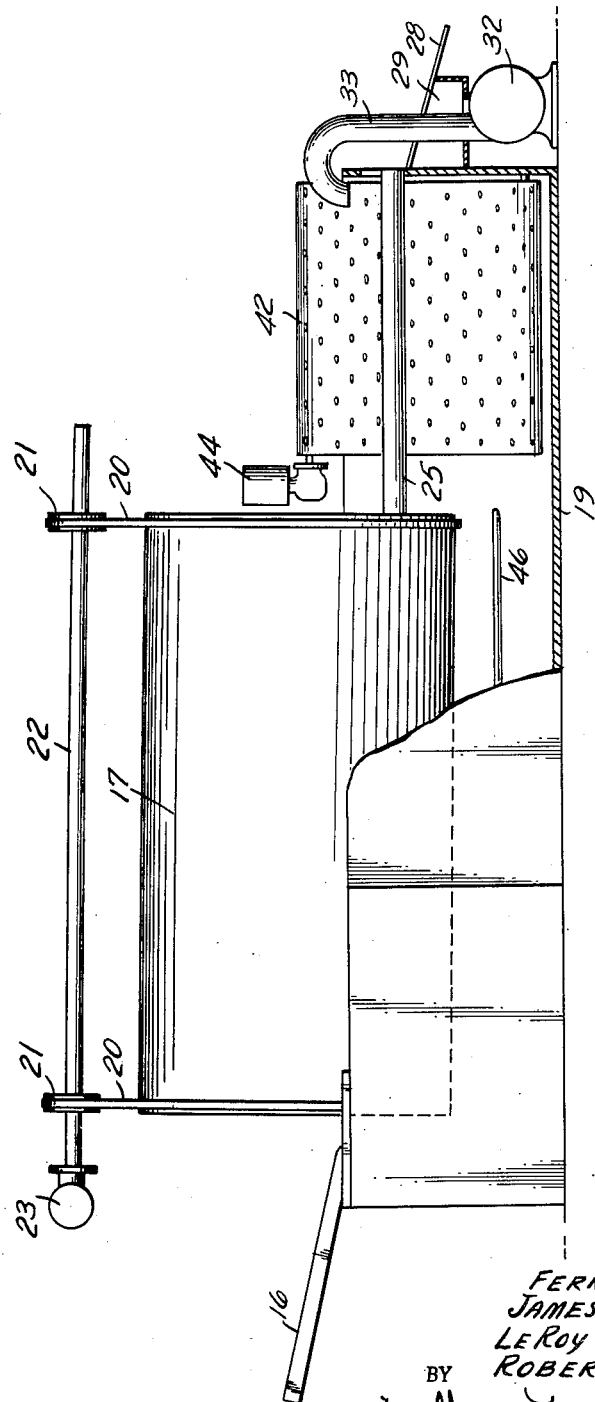
FIGURE 3 is a side elevational view, with parts broken away and parts shown in section of the form of machine according to FIGURES 1 and 2.

According to the process of the invention of the parent application aforesaid, the oyster meats are solidified, as by freezing, in the closed shells as a preliminary step prior to the opening or shelling of the oysters. Subsequent to such freezing operation the oysters may be shucked in any desired manner, for instance manually by the use of a knife inserted between the shells for the purpose of prying the valves apart. However, we have found it more expeditious to conduct the shucking or opening operation by machine in which the oysters are subjected, after freezing or solidification, to impact shock.

Moreover we have found that when oysters are frozen within their shells, the adductor muscles and hinge ligaments or cartilage become brittle and susceptible to detachment by stresses produced by impact shock. Accordingly, when stress of a shear nature is produced by the impact of tumbling the frozen whole oysters, the shells are more easily forced apart and the adductor muscles are more easily disengaged from the shells. Moreover, the frozen meat is delivered from the shells whole and in a solid state unable to lose weight through "bleeding."

Not only is the hard frozen meat less susceptible to mutilation by accidental contact with the sharp edges of the shells, but we have devised an improved apparatus for tumbling the oysters whereby the chances of such accidental contact of meat and shell are greatly minimized.

It is believed that in the process according to the invention the hinge ligament is broken almost upon the first fall of the oyster in the tumbler. The shells are temporarily held together by the adductor muscle and by the fact of the meat and shells having been frozen into an integral whole. As the tumbling continues, the meat begins to thaw and when just sufficient thawing has taken place to allow room for slight movement of the meat within the shell, the shear stress produced by the fall of the oyster incident to the tumbling action will disengage the ends of the adductor muscle from the shells and will break any adherence of the frozen meat from the shell. The shells will then separate from each other delivering a meat which is still substantially frozen solid. The process offers the further advantage of individually frozen meats, rather than a frozen block of oyster meats as would be the case if the oysters were frozen only after the removal of the shells. The ultimate consumer may therefore thaw only the number of oysters required at one particular time.

As a second form of a process according to the invention the same may include the following steps.

First: The freezing of live oysters within their shells.

Second: The subjection of the oysters to shear stress through impact or other means while the oyster begins to thaw, in order to break the hinge ligament or cartilage, to detach the adductor muscle from the shells, and to force the shells apart.

A third example of the method consists in steps first and second above set forth together with the following further step.

Third: The separation of the loose frozen meats from the empty shells.

We envision that the second and third stages of the process may be accomplished either in one mechanical unit provided both with tumbling impact means to produce shear stress and with separating means, or by two mechanical units wherein the tumbling impact means and the separating means are incorporated in separate devices used successively.

The drawings illustrate apparatus combining both the tumbling means and the separating means.

Referring more particularly to that form of machine shown in the FIGURES 1 to 6 inclusive, 15 designates an oyster freezing unit of any appropriate character and 16 a chute or conveyor input connecting with the unit 15 and entering the higher induction end of a rotary tumbling inclined drum 17. The drum is carried upon rollers 18 journaled in appropriate brackets upon the internal side walls of the water or brine tank 19.

The drum 17 may be driven by any appropriate means, for instance by the encircling drive belts 20 which are also trained over drive sheaves 21 fixed to a power shaft 22 driven by a drive motor 23.

Within the drum are affixed spiral lifting vanes 24 which are preferably perforated. Extending through the lower portion of the drum but entirely independent thereof and separated therefrom is an oyster meat recovery flume 25 which may be carried in the end walls of the tank 19. The lower end wall 27 is provided with an opening 26 through which the flume 25 is fitted and beyond the flume are arranged a number of spaced inclined drain rods 28 disposed at least partially above a drain basin 29 which connects with a return pipe 30 by which water or brine may be recirculated to the tank 19 by means of a pump 31, driven by a motor 32, and a riser pipe 33 having an open upper end disposed over the tank.

Within the drum or cylinder 17 and carried by the flume 25 is an anvil 34 consisting of plates 35 and 36 meeting in a ridge 37. The anvil 34 is affixed to movable legs 38 having slots 39, as shown in FIGURE 6 to receive bolts 40 carried by fixed legs 41 which are affixed to the flume 25.

A shell conveyor 42 is mounted to move transversely on an inclination within the tank 19 beyond the discharge or lower end of the drum 17. The upper end of the conveyor 42 encircles a drive drum 43 driven by a motor 44. At its lower end the conveyor 42 extends about an idler drum 45, shown in FIGURE 4 as being appropriately journaled in the lower portion of the tank 19.

A suitable number of refrigerating coils 46 may also be arranged in the tank 19 and connected to a refrigeration unit 47 located just outside a side wall of such tank 19.

In operation of this form of device, it will be understood that the tank 19 is filled to a suitable height with appropriate liquid, for instance a brine solution in water appropriate for being maintained at a temperature in the vicinity of the freezing point of oysters, although not necessarily at or below such freezing point. The desired refrigerating temperature will be maintained by means of the unit 47 and the coils 46.

The oysters are delivered by the oyster freezing unit by way of the chute or conveyor into the higher receiving end of the drum or cylinder 17 which is preferably imperforate. The drum extends, at least at its lower part, into and below the liquid level in the tank 19, the liquid level being determined by the flume 25 which is a half-cylindrical pipe open at its upper portion into which the liquid in the tank 19 may flow, the flume 25 also being preferably inclined downwardly to the opening 26.

Figure 4:
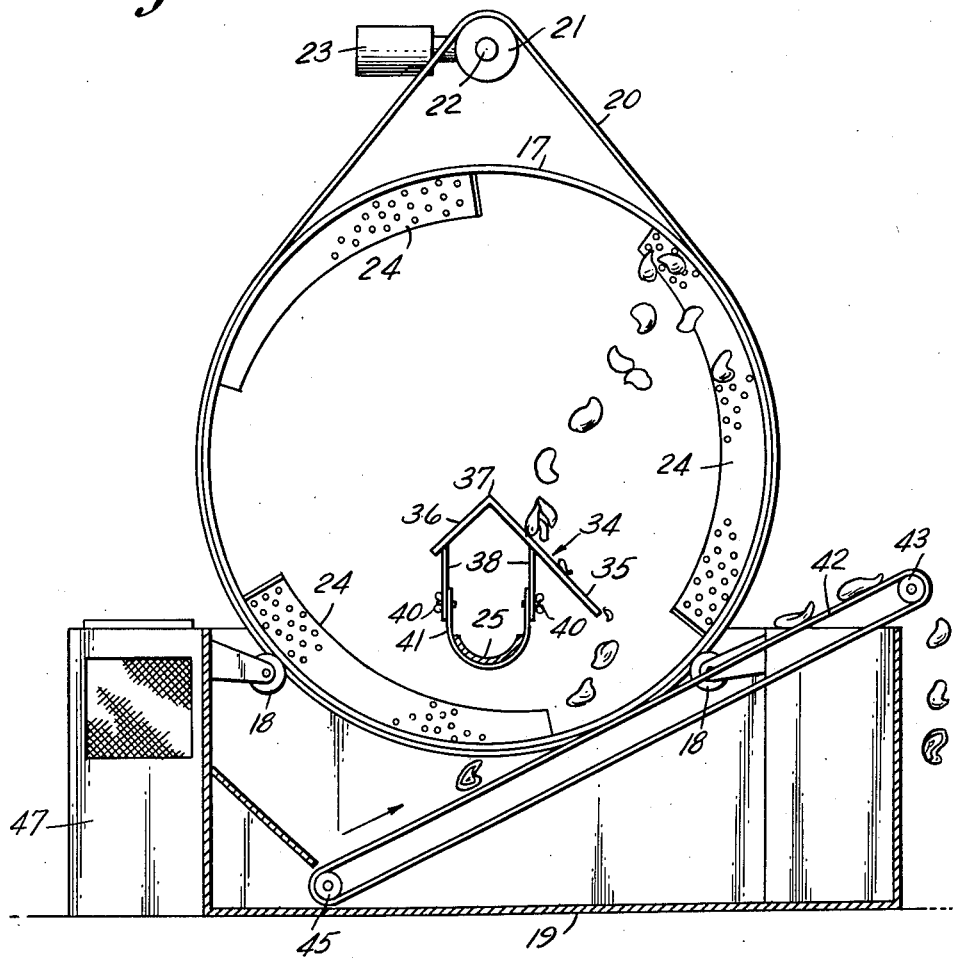
FIGURE 4 is a cross-sectional view taken on the line 4—4 in FIGURE 1.
Figure 5:
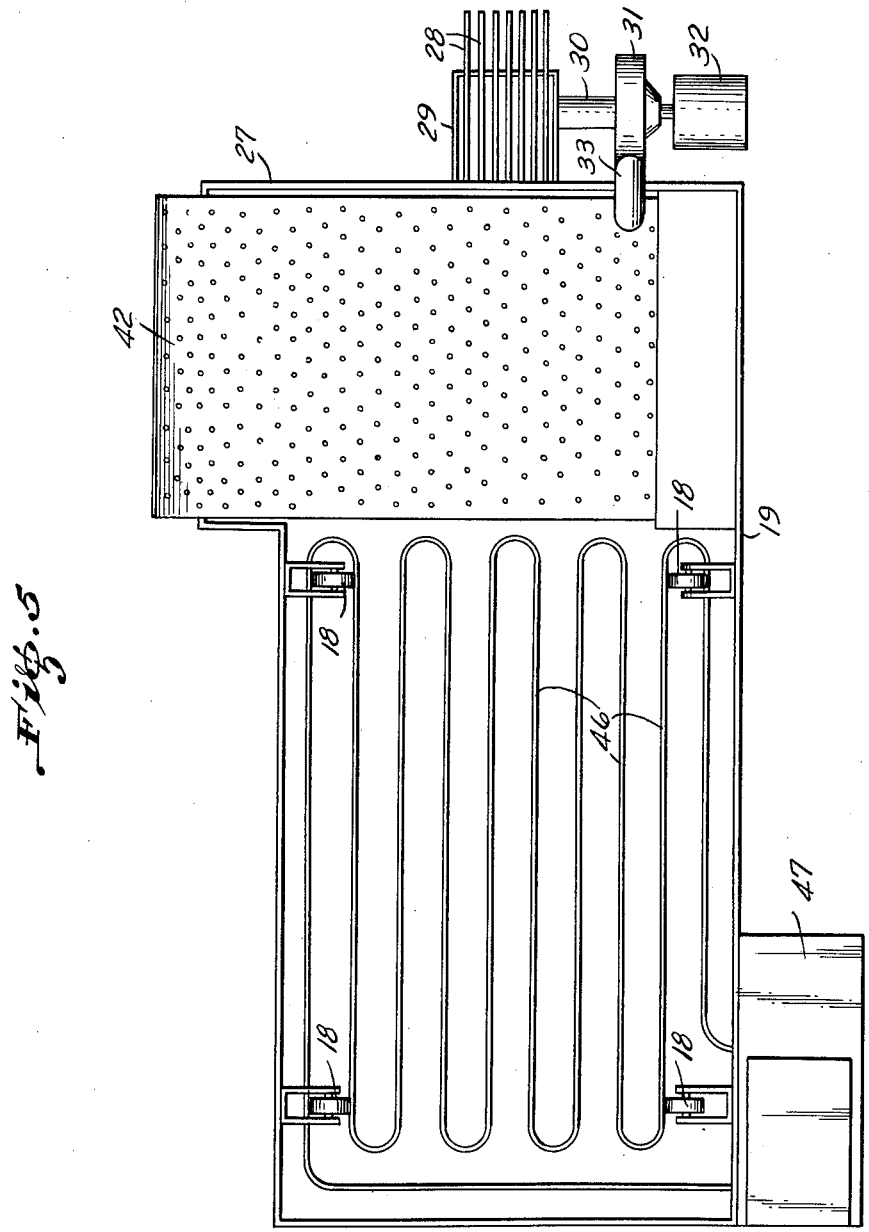
FIGURE 5 is a top plan view of the machine with the tumbling drum removed.

The whole frozen oysters delivered to the drum 17 will fall into the lower portion of the drum and encounter the spiral vanes 24. These vanes will lift the whole oysters incident to the rotation of the drum as illustrated in FIGURE 2 and at certain point in the rotation will drop the oysters off the vanes and upon the anvil 34. As shown in FIGURE 6 the anvil 34 is adjustable as to height so that it may be raised or lowered to achieve the proper distance of fall of the oysters. The impact of the fall will produce sheer stress in the oyster which will break open the shells and have the effect of shucking the oysters and also breaking the hinge ligaments and detaching the adductor muscles from the shell. The shells will fall on to the top run of the perforated conveyor belt 42 and be discharged from the tank at the right side thereof as shown in FIGURE 4. The frozen detached oyster meats will fall into the tank and float atop the liquid in the tank and will be drawn by the flow of fluid into the recovery flume 25 and discharged through the opening 26 onto the grid or inclined drain grate bars 28. The water discharging through the opening 26 will pass downwardly between the grate bars 28 into the catch basin 29 and recirculated to the tank 19 by the pipes 30, 33.

The lower portion of the tumbler drum 17 may or may not be partially immersed in the liquid in the tank 19. It could be supported so that its lower portion and all parts would be above the surface level of the liquid in which event the meats and shells would be discharged at the exit end of the tumbler into one end of the tank. In this case the shell removing conveyor 42 could extend the entire length of the tank. The meats and shells would be separately recovered from the tank in the same manner as previously described and illustrated.

The vanes 24 which are spirally mounted upon the cylinder wall of the drum 17 provide lift to the oysters and also aid in ejecting trash shell from the device. The vanes are preferably perforated to reduce resistance to rotation to the water or brine. The inclination of the drum or cylinder 17 is to provide for movement of the oysters and shell through the device.

The perforations in the belt 42 aid draining of the shells before the discharge over the sides of the tank.

The rods 28 are spaced to retain oyster meat while water or brine drains into the basin 29.

It will be noted that the anvil 34 extends above the flume 25 throughout the length of the drum 17 in which whole frozen oysters are dropped from the vanes 24. Therefore this anvil 34 protects the flume 25 and any oyster meats therein. Moreover the shape of the anvil is sloping from the ridge 37 in opposite directions along the plates 35, 36 so that any meat discharged from the shells by the impact process will not remain upon the anvil to be struck by subsequent falling oysters but will slide down the inclined plates into the water or brine bath in the tank 19.

Referring more particularly to FIGURES 7 to 9 inclusive, 48 designates a reciprocating slide plate or inclined plane which is affixed to reciprocating shafts 49 mounted in slip bearings 50 above a brine tank 51. The shafts 49 and slide plate 48 may be reciprocated by any appropriate means, one form of which is shown in FIGURE 7, where pivots 52 connect ends of the shafts 49 to pitmen 53, which inturn are connected by pivots 54 to rotary discs 55 affixed upon a drive shaft 56 appropriately supported at the side of the brine tank 51. The drive shaft 56 may be driven by pulley-belt drive 57 from a motor 58 or by other suitable means.

Erected upon the slide plate 48 longitudinally thereof are side walls 59 carried by supports 60 so that clearance space or slots 61 are provided between the lower edges of the side walls 59 and the slide plate 48.

In one side wall of the brine tank 51 is an opening 62 at liquid level for the outflow of brine to carry the separated oyster meats to spaced inclined drain rods or a grate 63 above a drain basin 64. The basin 64 is connected by return pipe 65 to the tank 51, a pump being included in the line. The end of the return pipe 66 is shown as entering the brine tank 51 just above the liquid level, for which see FIGURES 7 and 8.

As shown in FIGURES 8 and 9, the lower portion of the brine tank 51 may be inclined or hopper-shaped to connect at its lowest point with a drain having a drain valve 67 therein to flush out chip sediment.

In the operation of this form of the invention the frozen whole oysters are introduced at the induction end of the slide plate 48, which together with the side walls 59 constitutes a trough which is reciprocated at high speed, causing the side walls 59 to strike the whole oysters with great force. The shells will thereby be opened and the frozen oyster meats discharged therefrom. The clearance spaces or slots 61 will be adjusted to permit the passage of the oyster meats which may thereupon fall into the brine solution, such frozen meats being indicated at 71. Such oyster meats are subsequently flowed off through the opening 62 to the spaced rods or grate 63, the water draining therefrom into the basin 64 and being returned by the pipe 65 to the tank 51. The oyster meats 71 slide off the grid 63 and are caught in a suitable container or conveyor. The oyster shells 70 are too large to pass through the clearance openings or slots 61 and are therefore retained in the trough until they are discharged at the lower end 69 thereof.

Due to the inclination of the trough and the movement imparted thereto the oysters and the empty shells will be gradually moved longitudinally of the trough from the induction end 68 to the empty shell discharge 69. It will be noted that the trough is narrower than the tank 51 so as to assure that the freed oyster meats 71 will fall into the brine solution in the tank 51 no matter what the lateral position of the trough at any particular time.

The slide plate 48 may be hard surfaced to permit the same to slide under the oysters particularly when the movement of the trough is reversed so that the oysters may not be carried from side to side with the trough which would have a diminishing effect upon the impact and the shear force to be developed by the side walls 59 upon the whole oysters. The step of freezing the oysters and the further subsequent step of subjecting the oysters to blows by the side walls 59 will not only result in the opening of the oysters but also the detachment of the hinge ligaments and the adductor muscles.

The brine level in the tank can be maintained by well known float valve control supplying brine from reservoir.

Referring more particularly to that form of the invention shown in FIGURES 10 to 13 inclusive, 72 designates one or more rotary paddle wheels 72 mounted upon shafts 73 journaled in bearings 74 above the brine tank 51ª. The shafts 73 may be driven by an electric or other motor 75 through the intermeshing pinions 76, 77 or other form of transmission.

Above the paddles 72 is arranged a curved shield 78, the longitudinal edges of which are in spaced relation to the side plates 79 which have inwardly extending stop or anvil lips 80 at their upper longitudinal edges.

Figure 10:
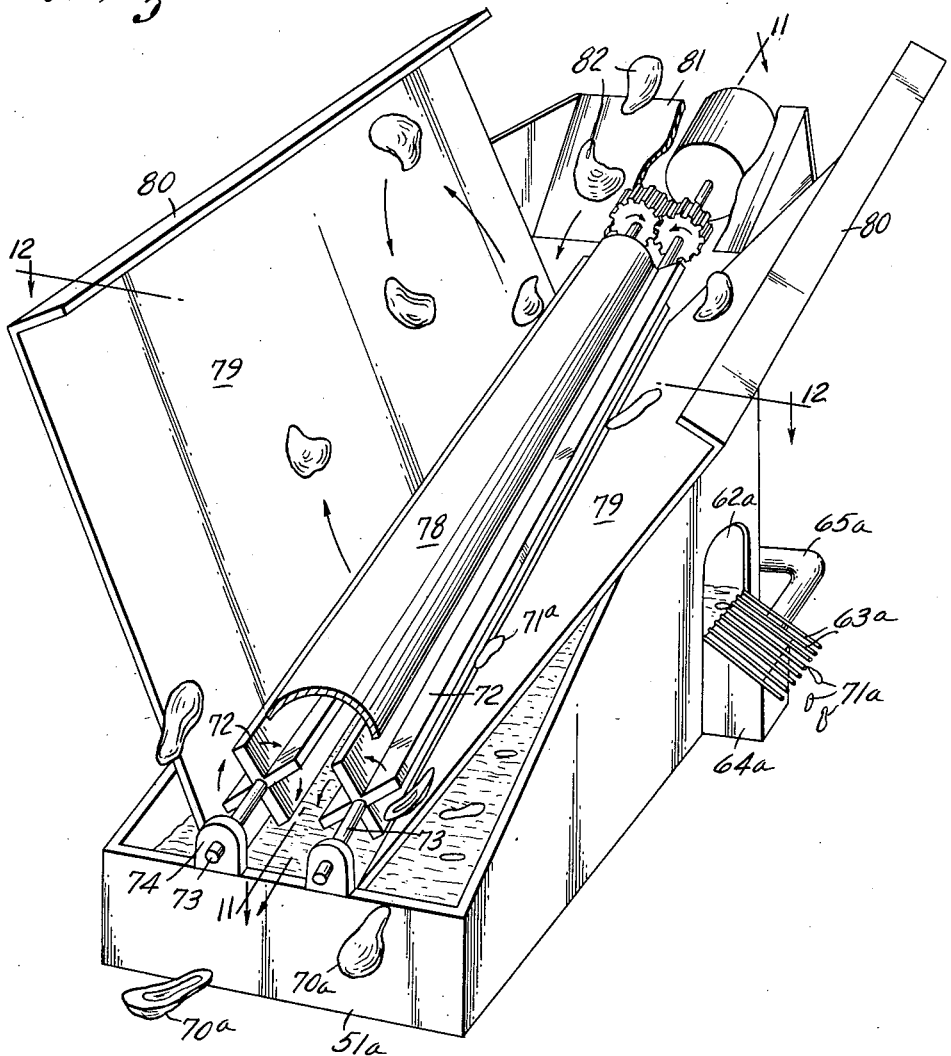
FIGURE 10 is an isometric view of a still further modified form of the machine.

The device is preferably inclined from a higher induction end 81 at which the whole oysters 82 are introduced as shown more particularly in FIGURE 10.

In the use of this form of the invention, as the whole oysters 82 slide by gravity down the inclined trough provided between the shield 78 and each side wall 79, such whole oysters are permitted to descend upon the paddles 72 which are constantly rotating, in the directions indicated by the arrows in FIGURE 10. These paddles are preferably rotated at high r.p.m. and consequently the radial paddles will strike the oysters with considerable force. The paddles are preferably of metal, due to the direction of rotation and the speed of rotation the striking of the oysters by the paddles causes the same to be driven with considerable force up against the stop lips 80 of the side plates 79. The oysters therefore receive impact not only by the paddles 72 but also from the lips 80. It will of course be understood that the oysters are received into the device in a frozen or substantially frozen condition and that freezing units may be mounted adjacent the induction end 81 for convenience in delivering frozen oysters to the device, and a freezing unit may also be mounted adjacent to the induction end of the reciprocating trough of FIGURE 7.

As shown in FIGURE 12, the paddles 72 are so adjusted with reference to the side plates 79 that clearance space is provided between the paddles and the side plates of a gauge or distance sufficient to permit the meats 71ª to pass downwardly into the brine in the tank 51ª, but rejecting the empty shells 70ª. These shells must therefore slide down the whole length of the trough and be discharged as indicated in FIGURE 10 at the lower eduction end of the trough. FIGURE 12 also shows the meats 71ª as being floated off free of shell to the grid or spaced rods 63ª. As shown in FIGURE 10, the brine tank is provided with an opening 62ª for the floating off of the frozen oyster meats. FIGURE 10 also illustrates a catch basin 64ª and a return pipe 65ª which has a pump therein for recycling the brine solution from the catch basin 64ª to the brine tank 51ª.

In addition to the above described processes for the removal of the oyster meat from the shell, the process may, in alternative form, consist of first, freezing the oyster, secondly subjecting the oyster to a partial thaw whereby adherence between the frozen oyster meat and the interior of the shell is broken and then tumbling the oyster as hereinabove described or otherwise shucking the same.

It will be appreciated that in all forms of the invention an immediate escape path is provided for the recovered frozen oyster meats after shucking in order to protect such meats from liability to injury from the shells of both shucked and unshucked oysters.

In connection with FIGURE 1, this escape path is comprised of the vertical spaces at opposite sides of the anvil. To facilitate movement of the frozen oyster meats to this vertical escape path the side walls 35, 36 of the anvil are downwardly and divergently sloped.

In FIGURE 2 the escape path is shown as a flooded area and the relative position of the flume 25 and anvil 34 is such that the liberated frozen oyster meats which are lighter in weight and, therefore, buoyant will float upon the brine solution. The flume creates a current longitudinally of and beneath the anvil and will therefore immediately pull in the floating frozen oyster meats beneath the protection of the anvil. In this way every advantage is taken to quickly evacuate the frozen oyster meats away from the shucking area which in this instance is the anvil 34. Due to the fact that this is a flooded escape path, any floating frozen oyster meats that would be struck by descending oysters or oyster shells would be able to dive and give with the blow so as to minimize any injury thereto. This escape path is substantially immovable in space.

In the form of invention shown in FIGURES 7 to 9, the escape path is horizontally through the openings below the side boards 59 and thence vertically down into the brine below.

In the form shown in FIGURES 10 to 12 inclusive, the escape path is the opening between the paddles and the side walls 79, this also being vertical. In all cases advantage is taken of gravity to permit the rapid escape of the liberated frozen oyster meats from the shucking area.

Although we have disclosed herein the best form of the invention known to us at this time, we reserve the right to all such modifications and changes as may come within the scope of the following claims.

What is claimed is:

1. In a machine for shucking oysters, a rotary tumbling drum adapted to receive oysters at one end and having vanes therein for lifting the oysters and dropping the same at a high portion of the drum incident to its rotation, and an anvil mounted within the drum but non-rotary with respect to the drum and located to receive the impact of the dropped oysters, said anvil composed of two downwardly divergent plates from a central narrow ridge.

2. Apparatus for shucking previously frozen oysters without liability to mutilation of the freed oyster meats comprising shucking means for opening the frozen oysters, and removal means located relatively to the shucking means for removing the shucked oyster meats from association with the unshucked frozen oysters and out of the shucking path of said unshucked oysters, said removal means having as a part thereof an unimpeded escape path from the shucking means.

3. Apparatus for shucking frozen oysters as claimed in claim 2 further comprising tank means holding a body of liquid brine below the shucking area, said escape path being substantially vertical to induce dropping by gravity immediately on freedom from the shells of the frozen oyster meats into the brine where the frozen expanded oyster meats including the liquid content of the oyster meats will float while shells and particles of shells will sink to the bottom.

4. Apparatus as claimed in claim 3 further comprising deflecting means for guiding the freed frozen oyster meats directly through the escape path to the body of liquid brine where the frozen oyster means will be floatingly and yieldably supported whereby if struck by a descending shell or particle of shell the meats will give with the blow by immersing in the brine to avoid injury to the meats.

5. Apparatus as claimed in claim 4 in which the deflecting means is a slide floor plate of the shucking area.

6. Apparatus as claimed in claim 4 in which the deflecting means is a side plate having an anvil at its upper portion, and a paddle wheel positioned to drive the whole frozen oysters against the anvil, the escape path being between the paddle and side plate.

7. In a machine for shucking oysters and the like, a brine tank, an anvil in the tank above the brine in said brine tank, receiving means for uncooked frozen oysters spaced above the anvil for dropping such oysters upon the anvil to open the valves and recover substantially the whole of the oyster meats to and including the juice and water content in solid frozen form wherefrom on defrosting to make available fresh raw oysters with complete original juice and water complement, and means associated with the anvil for creating a current in the liquid brine to draw the liberated floating frozen oyster meats beneath the protection of the anvil.

8. In a machine for shucking oysters and the like, a brine tank, an anvil in the tank above the liquid level, receiving means for uncooked frozen oysters spaced so substantially above the anvil for dropping such oysters upon the anvil to open the valves and recover substantially the whole of the oyster meats to and including the juice and water content in solid frozen form, and a sloping flume spaced below the anvil at substantially surface level in the brine for creating a current in the brine to draw the floating frozen oyster meats under the anvil.

9. An apparatus for treating oysters comprising freezing means for freezing the live oysters within their shells, impact means for subjecting a plurality of the frozen oysters to shear stress to shuck the same, a connection between said freezing means and impact means, and separating means positioned to receive the shucked oysters from the impact means for separating the frozen meats from the opened shells and to protect the shucked oysters from being struck by unshucked oysters and oyster shells.

10. An apparatus as claimed in claim 2 wherein said unimpeded escape path is substantially a straight-line escape path joined to the shucking means.

11. An apparatus as claimed in claim 2 wherein said shucking means is a rotary drum having a stationary anvil positioned within said drum to be contacted by the unshucked oysters to open same.

12. An apparatus as claimed in claim 2 wherein said escape path is a covered escape path for protecting the shucked oysters from unshucked oysters and oyster shells.

References Cited in the file of this patent
UNITED STATES PATENTS

| | | |
|---|---|---|
| 2,047,688 | Jenkings | July 14, 1936 |
| 2,102,945 | Doxsee et al. | Dec. 21, 1937 |
| 2,234,157 | Jones | Mar. 4, 1941 |
| 2,652,588 | Harris | Sept. 22, 1953 |
| 2,808,612 | Snow | Oct. 8, 1957 |
| 2,818,598 | Skrmetta | Jan. 7, 1958 |